United States Patent
Rowe et al.

(10) Patent No.: US 11,232,516 B1
(45) Date of Patent: Jan. 25, 2022

(54) SYSTEMS AND METHODS FOR GENERATING ACCOUNT FORECAST ALERTS

(71) Applicant: United Services Automobile Association (USAA), San Antonio, TX (US)

(72) Inventors: Nathan J. Rowe, San Antonio, TX (US); Michael Aaron McGlasson, Austin, TX (US); Stephen Holloway, San Antonio, TX (US); Lea B. Sims, San Antonio, TX (US); Joseph Wall, San Antonio, TX (US); Richard R. Rohrbough, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 162 days.

(21) Appl. No.: 15/902,895

(22) Filed: Feb. 22, 2018

Related U.S. Application Data

(60) Provisional application No. 62/462,189, filed on Feb. 22, 2017.

(51) Int. Cl.
    *G06Q 40/02* (2012.01)
    *G06Q 20/10* (2012.01)
    *G06Q 10/04* (2012.01)

(52) U.S. Cl.
    CPC ............. *G06Q 40/02* (2013.01); *G06Q 10/04* (2013.01); *G06Q 20/10* (2013.01)

(58) Field of Classification Search
    None
    See application file for complete search history.

(56) References Cited

U.S. PATENT DOCUMENTS

| | | | |
|---|---|---|---|
| 7,792,748 B1* | 9/2010 | Ebersole | G06Q 40/00 705/39 |
| 7,895,102 B1* | 2/2011 | Wilks | G06Q 40/08 705/35 |
| 10,210,569 B1* | 2/2019 | Kim | G06Q 20/108 |
| 2002/0133378 A1* | 9/2002 | Mault | A61B 5/222 705/3 |
| 2009/0048994 A1* | 2/2009 | Applebaum | G06F 16/24565 706/45 |
| 2010/0268629 A1* | 10/2010 | Ross | G06Q 10/10 705/35 |
| 2014/0067634 A1* | 3/2014 | Sowder | G06Q 40/06 705/35 |
| 2015/0193868 A1* | 7/2015 | Del Vecchio | H04L 67/10 705/35 |
| 2016/0253702 A1* | 9/2016 | Gonzales, Jr. | H04W 4/023 705/14.48 |

* cited by examiner

*Primary Examiner* — Ryan D Donlon
*Assistant Examiner* — Toan Duc Bui
(74) *Attorney, Agent, or Firm* — Fletcher Yoder, P.C.

(57) ABSTRACT

A system may include a processor that may receive account information having a plurality of transactions associated with a bank account. The processor may then determine an expected burn rate of funds based on the account information, determine an expected savings balance at a first time based on the account information and the expected burn rate, generate an event in response to the expected savings balance being below a threshold, and send an alert including the event to a computing device associated with the user. The alert may indicate a status of the expected savings balance via an electronic display of the computing device.

19 Claims, 4 Drawing Sheets

SYSTEMS AND METHODS FOR GENERATING ACCOUNT FORECAST ALERTS

CROSS-REFERENCE TO RELATED APPLICATION

The application claims the benefit of U.S. Provisional Patent Application Ser. No. 62/462,189, titled "Systems and Methods for Generating Account Forecast Alerts," which was filed on Feb. 22, 2017, the entirety of which is incorporated by reference into the present disclosure.

BACKGROUND

The present disclosure relates generally to generating account forecast alerts. More specifically, the present disclosure relates to providing a system for monitoring account information related to a user and generating account forecast alerts for the user based on the account information.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a processor that may receive account information having a plurality of transactions associated with a bank account. The processor may then determine an expected burn rate of funds based on the account information, determine an expected savings balance at a first time based on the account information and the expected burn rate, generate an event in response to the expected savings balance being below a threshold, and send an alert including the event to a computing device associated with the user. The alert may indicate a status of the expected savings balance via an electronic display of the computing device.

In another embodiment, a non-transitory computer-readable medium may include computer-executable instructions that, when executed, are configured to cause a processor to receive a target saving amount via user input, receive account information including a first plurality of transactions associated with a bank account over a first period of time, identify one or more variable expenditures in the account information, and determine a target spending amount based on the account information, the variable expenditures, and the target saving amount. The processor may then receive updated account information including a second plurality of transactions associated with the bank account over a second period of time, detect that a current spending amount associated with the second period of time exceeds the target spending amount, and send an alert to a computing device including an electronic display in response to the current spending amount exceeding the target spending amount, such that the alert is depicted via the electronic display.

In another embodiment, a method may include using a processor to receive account information including a plurality of transactions associated with a bank account. The method may then include determining an expected burn rate of funds based on the account information, determining an expected savings balance at a first time based on the account information and the expected burn rate, generating an event in response to the expected savings balance being above a threshold, and receiving an indication of a virtual envelope to associate excess funds associated with the expected savings balance being above a threshold. The method may then include generating a visualization of the virtual envelope for display via an electronic display.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
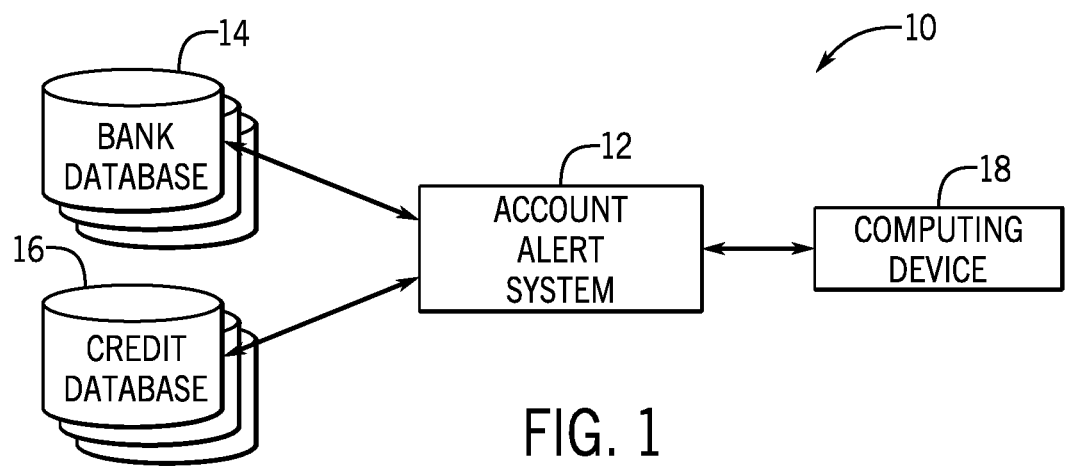
FIG. 1 illustrates a block diagram of an account monitoring system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As the general population makes less cash transactions and more digital transactions, it becomes increasingly difficult for each individual to track the amount of savings or expendable funds available in his respective bank account. That is, as numerous bills are scheduled to be electronically (e.g., automatically) withdrawn at various times and income electronically deposited at various times, individuals may not be aware of what they are able to spend without exceeding a budgeted amount or while maintaining enough funds to pay future bills.

With the foregoing in mind, in certain embodiments, an account alert system may monitor a user's bank account and various credit accounts to assist the user in determining an amount of available funds that the user can spend for a certain period of time (e.g., day). The account alert system may analyze the user's bank account to determine when expected deposits are to occur and when expected bills are to be withdrawn. In addition to analyzing the user's bank account, the account alert system may communicate with credit accounts associated with the user to track each credit purchase soon after the transaction occurs. Based on the information tracked by the account alert system and a desired savings amount input by the user, the account alert system may determine an amount of funds available for the user to spend for a certain amount of time (e.g., day). In one embodiment, the account alert system may generate a weather icon or visualization to represent the status or state of the user's budget. For example, if the user is on track for exceeding his desired savings amount, the account alert system may generate a sunny weather icon. Alternatively, if the user has exceeded his allotted budget and will unlikely have enough available funds to pay expected bills, the account alert system may generate a thunderstorm weather icon (e.g., cloud with lightning bolt). By associating weather icons with budgeting status, the user of the account alert system may more easily recognize the state of his account, and thus may take corrective actions more quickly.

In addition, if the user's transactions for the certain time period exceed the determined amount available, the account alert system may send a notification to a computing device (e.g., mobile phone) indicating that the user has exceeded his budget amount. Moreover, the account alert system may automatically adjust the determined amount of available funds for the user to spend based on the desired savings amount input and the recent transactions. Additional details regarding the account alert system and various processes performed by the account alert system will be described below with reference to FIGS. 1-8.

By way of introduction, FIG. 1 illustrates a block diagram of an account management system 10 for monitoring a user's bank account(s) and credit account(s) and providing notifications to the user's computing device in accordance with present embodiments. As such, the account management system 10 may include an account alert system 12, one or more bank databases 14, one or more credit databases 16, and a computing device 18. The account management system 10, in certain embodiments, may be a cloud-based computing system that includes a number of computers that may be connected through a real-time communication network, such as the Internet. In one embodiment, large-scale analysis operations may be distributed over the computers that make up the cloud-based computing system. Although the account alert system 12 is described above as a cloud-based computing system, the account alert system 12 may be any suitable computing device that is capable of communicating with other devices and processing data in accordance with the techniques described herein.

In one embodiment, the account alert system 12 may be communicatively coupled to one or more bank databases 14 and/or one or more credit databases 16. The bank databases 14 may include data or information regarding a user's bank account. As such, the bank databases 14 may include data regarding available cash balance in various bank accounts, various lines of credit available via a banking institution, debts (e.g., mortgages) associated with various banking institutions, and the like.

The credit database 16 may include data regarding a user's current amount of credit available with a credit agency. In certain embodiments, the credit database 16 may be updated soon (e.g., seconds) after a credit transaction is executed by the user. The account alert system 12 may receive notifications from the credit database 16 for each credit transaction or the account alert system 12 may query the credit database 16 at certain time intervals to determine the credit transactions that have previously occurred.

After receiving the data regarding banking information and/or credit information, the account alert system 12 may determine a spending budget for the user based on available funds, expected payments, expected deposits, and a desired savings balance. That is, the account alert system 12 may receive an input from the user indicating a desired saving amount and a time. As such, the account alert system 12 may determine an spending amount or amount of disposable income for a period of time (e.g., day, week, month) based on the desired saving amount, the time in which the desired saving amount is expected, the available funds, the expected payments, and the expected deposits.

In one embodiment, the account alert system 12 may perform various analyses in accordance with present embodiments on the data acquired from the bank database 14 and the credit database 16 and may send notifications to the computing device 18 associated with the user. The computing device 18 may include any suitable processor-based computing system such as a desktop computer, a laptop computer, a mobile computing device (e.g., smart phone), a tablet computing device, and the like. In any case, the computing device 18 may receive a notification from the account alert system 12 and may provide an indication to the user that the notification was received. The indication may be a ring tone, a vibration pattern, a visualization, or the like. In some embodiments, the indication may be activated despite the computing device 18 being in a sleep or low power mode to increase the likelihood that the user will take note of the indication.

Although the account alert system 12 is described as sending notifications to the computing device 18, in some embodiments, the account alert system 12 may be a computing device associated with the user. As such, the account alert system 12 may be accessible to the user and may generate visualizations and alerts to notify the user regarding his account alerts or status.

Figure 2:
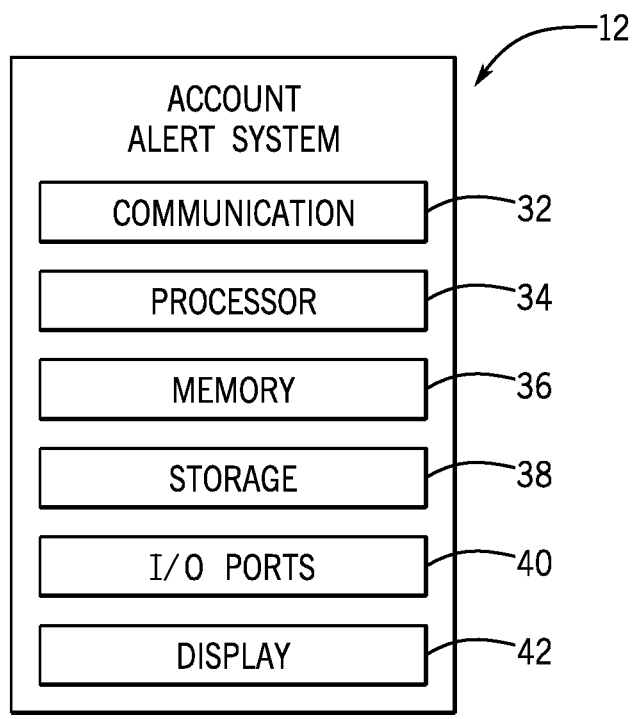
FIG. 2 illustrates a block diagram of the account alert system employed by the account monitoring system of FIG. 1, in accordance with embodiments described herein.

To perform some of the actions set forth above, the account alert system 12 may include certain components to facilitate these actions. FIG. 2 is a block diagram of example components within the account alert system 12. For example, the account alert system 12 may include a communication component 32, a processor 34, a memory 36, a storage 38, input/output (I/O) ports 40, a display 42, and the like. The communication component 32 may be a wireless or wired communication component that may facilitate communication between the bank database 14, the credit database 16, the computing device 18, and the like.

The processor 34 may be any type of suitable computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent non-transitory, computer-readable media (e.g., any suitable form of memory or storage) that may store the processor-executable code used by the processor 34 to perform the presently disclosed techniques. The memory 36 and the storage 38 may also be used to store data, various other software applications, and the like. For example, the memory 36 and the storage 38 may not only store the processor-executable code used by the processor 34 to perform various techniques described herein but code for other techniques as well. It should be noted that non-transitory merely indicates that the media is tangible and not a signal.

The input/output (I/O) ports 40 may be interfaces that may couple to other peripheral components such as input devices (e.g., keyboard, mouse), sensors, input/output (I/O) modules, and the like. The display 42 may operate to depict visualizations associated with software or executable code being processed by the processor 34. In one embodiment, the display 42 may be a touch display capable of receiving inputs from a user of the account alert system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the account alert system 12.

It should be noted that the components described above with regard to the account alert system 12 are exemplary components and the account alert system 12 may include additional or fewer components as shown. Additionally, it should be noted that the computing device 18 may also include similar components as described as part of the account alert system 12.

Figure 3:
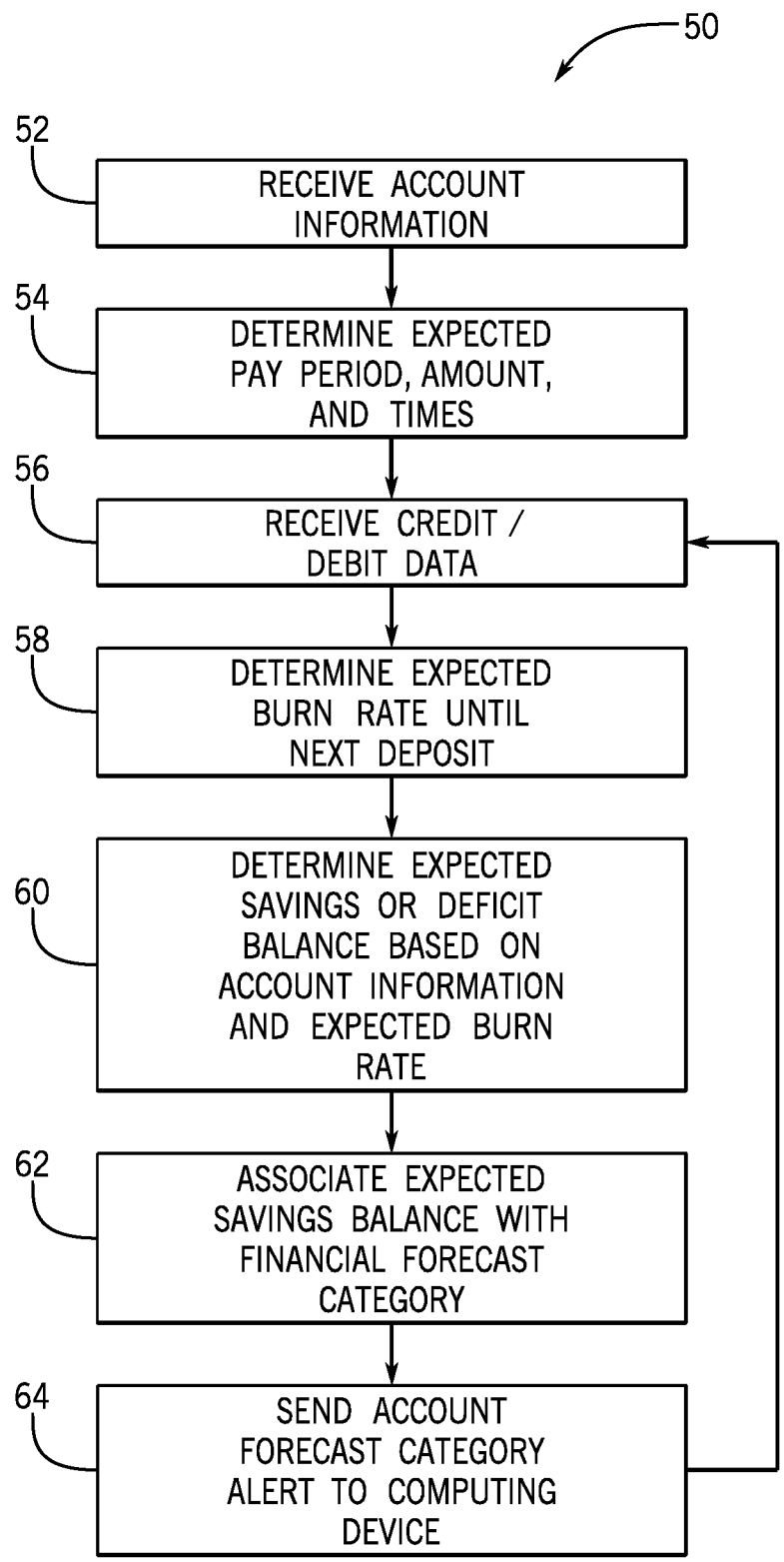
FIG. 3 illustrates a flow chart of a method for sending an account forecast notification to a computing device of the account monitoring system of FIG. 1, in accordance with embodiments described herein.

With the foregoing in mind, FIG. 3 illustrates a flow chart of a method 50 for sending an account forecast alert to the computing device 18, in accordance with embodiments described herein. Although the following description of the method 50 is described in a particular order, which represents a particular embodiment, it should be noted that the method 50 may be performed in any suitable order. Moreover, although the following description of the method 50 is described as being performed by the account alert system 12, it should be noted that the method 50 may be performed by any suitable computing device.

Referring now to FIG. 3, at block 52, the account alert system 12 may receive account information regarding a user from the bank database 14. The account information may include a list of debits and credits to one or more bank accounts over a period of time (e.g., months, year). In one embodiment, the account information may include bank statements. In yet another embodiment, the account information may be accessed in real-time (essentially immediately or within a matter of seconds) for analysis from the bank database 14, which may be maintained by a banking institution or the like.

The account information may provide data regarding each transaction to provide context for the transaction. For example, the account information may indicate whether a transaction is associated with dining, consumer goods, utilities, groceries, and the like. In addition, the transaction account information may indicate whether a deposit is automatic, periodic, directly deposited from an organization, and the like.

At block 54, the account alert system 12 may analyze the account information and determine expected pay periods, expected payments or deposits, expected times or dates for the expected payment, and the like. That is, the account alert system 12 may determine when deposits (e.g., paychecks) are expected to be present in the respective bank account. As such, the account alert system 12 may determine an expected account balance at various times in the future.

The account alert system 12 may also determine expected dates in which payments from the respective bank account will be made. For example, credit card bills, utility bills, and the like may be withdrawn automatically from the respective bank account on a particular day (e.g., first day of the month). The account alert system 12 may recognize when recurring payments occur and may determine whether the payment cost is fixed or variable.

In addition to receiving the account information, at block 56, the account alert system 12 may receive credit or debit data from the credit database 16. The credit data may include information regarding transactions that are associated with the user of a credit card or some other credit providing mechanism. As such, the credit data may be indicative of costs or debts that the user is expected to incur at some point in the future.

Using the information gleaned from the account information and the credit data, the account alert system 12 may, at block 58, determine an expected cash burn rate for the user until the next expected deposit. The expected burn rate may be determined based on expected or planned debits that are scheduled to be withdrawn from the respective bank accounts, an analysis of credit transactions over a period of time, and the like. In any case, the expected cash burn rate may indicate an amount of cash or funds that the user may spend from a current point in time until a time in which the next expected payment will be deposited in the respective account.

At block 60, the account alert system 12 may determine an expected savings or deficit balance at a certain time in the future based on the account information and the expected burn rate. In one embodiment, the account alert system 12 may deduct the expected burn rate amount over the period of days until the certain time from the account balance provided by the account information.

After determining the expected savings or deficit balance, the account alert system 12 may, at block 62, associate the expected savings or deficit balance with a financial forecast category. In one embodiment, the financial forecast category may correspond to certain weather forecast categories to invoke an immediate sense of a current financial or account status or future financial or account expectations for the user. People generally rely on weather forecast categories (e.g., sunny, partly cloudy, raining, storm) to plan the activities for their day. It is now recognized that such symbols are more accessible or interpretable than typical financial data. Thus, in accordance with present embodiments, the financial forecast categories may be correlated to weather forecast categories to impress on a user his current financial outlook. Present embodiments employ these well understood symbols to improve user awareness of account details.

Figure 4:
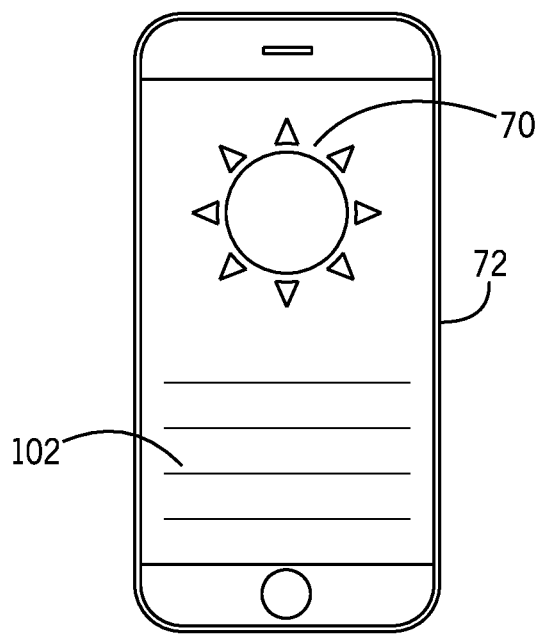
FIG. 4 illustrates a first example embodiment of an account forecast notification generated by the account alert system of FIG. 2, in accordance with embodiments described herein.
Figure 5:
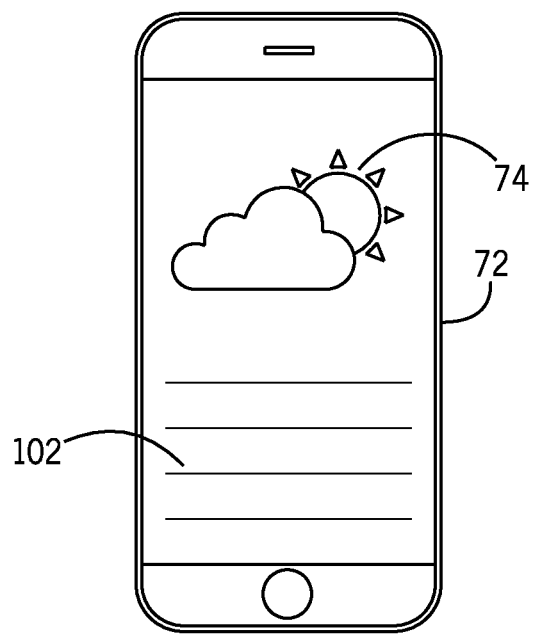
FIG. 5 illustrates a second example embodiment of an account forecast notification generated by the account alert system of FIG. 2, in accordance with embodiments described herein.
Figure 6:
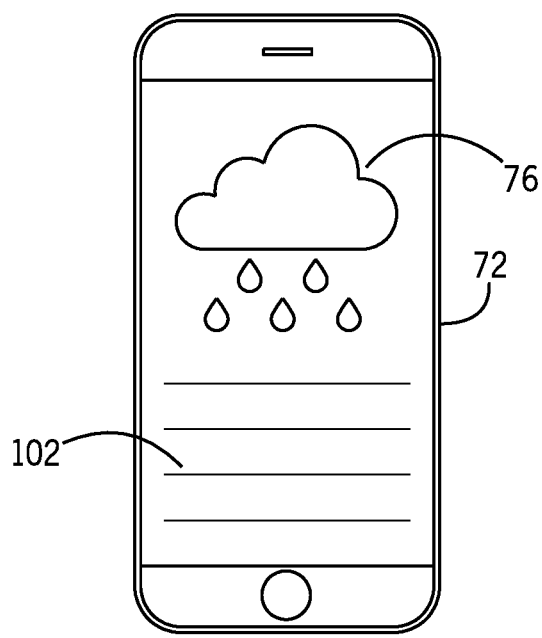
FIG. 6 illustrates a third example embodiment of an account forecast notification generated by the account alert system of FIG. 2, in accordance with embodiments described herein.
Figure 7:
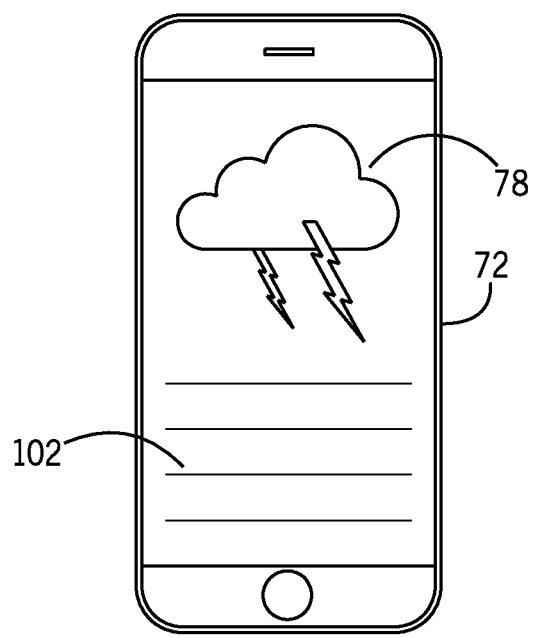
FIG. 7 illustrates a fourth example embodiment of an account forecast notification generated by the account alert system of FIG. 2, in accordance with embodiments described herein.

For example, a good financial outlook may correspond to a sunny weather icon 70 presented on a user device (specifically, a smart phone 72), as depicted in FIG. 4. A financial outlook less desirable than a good financial outlook may correspond to a partly cloudy weather icon 74, as depicted in FIG. 5. A concerning financial outlook that may be indicative of the user's inability to meet certain obligations (e.g., bills) may correspond to a raining weather icon 76, as depicted in FIG. 6, while a more dire financial outlook indicative of the user's inability to meet certain obligations (e.g., bills) for an extended period of time (e.g., weeks) may correspond to a lightning icon 78, as depicted in FIG. 7. It should be noted that the weather icons are provided as examples of how the financial forecast categories may be represented. However, other suitable icons may also be used to convey financial forecast categories such as stock market icons (e.g., bull, bear, up arrow, down arrow), traffic sign icons (e.g., red light, traffic signs), emojis (e.g., smiley face, sad face), and the like. Further, while illustrated as being depicted on the smart phone 72, in other embodiments, the various icons (e.g., 70, 74, 76, 78) may be presented on other user devices (e.g., laptops, home computers, electronic notebooks).

In certain embodiments, the association between the expected savings balance and the financial forecast category (e.g., as represented by icons 70, 74, 76, 78) may be determined based on user inputs indicative of thresholds between each financial forecast category. For instance, with reference to FIG. 3, the user may provide, via the account information received at block 52, percentage values that correspond to desired savings amounts for determining the associations between the expected savings balance and the financial forecast categories.

With the foregoing in mind, in one embodiment, the user may provide inputs indicating that a savings rate at 25% or higher corresponds to a first financial forecast category (e.g., sunny), a savings rate between 25% and 15% corresponds to a second financial forecast category (e.g., partly cloudy), a savings rate between 15% and 5% corresponds to a third financial forecast category (e.g., raining), and a savings rate less than 5% corresponds to a fourth financial forecast category (e.g., raining). With the foregoing example inputs in mind, example formulas for determining an appropriate financial forecast category are provided below for reference.

Sunny Forecast: (Expendable Balance/number of days until next expected deposit)>=(last deposit amount×25%/number of days between deposits)     (1)

Cloudy Forecast: (expected deposit amount×25%/number of days between deposits)>(Expendable Balance/number of days until next expected deposit)>(expected deposit amount×15%/number of days between deposits □     (2)

Raining Forecast: (expected deposit amount×15%/number of days between deposits)>=(Expendable Balance/number of days until next expected deposit)>=(expected deposit amount× 5%/number of days between deposits)     (3)

Stormy Forecast: (expected deposit amount×5%/number of days between deposits)>(Expendable Balance/number of days until next expected deposit)     (4)

Expendable Balance=(Current Account Balance)−(Sum of expected debits until next expected deposit)−(sum of expected savings until next expected deposit)     (5)

As shown in the example equations (1)-(5) above, the financial forecast category may be determined based on an expendable balance amount that corresponds to an amount of funds available for expenses after accounting for expected expenses (e.g., bills), expected savings (e.g., desired savings amount, income deferral, retirement savings) and expected deposits (e.g., paycheck, income, allowance, alimony). Generally, the equations provided above estimate an amount of funds available for a user to spend while maintaining an account balance that meets his desired savings goals while paying his expected bills. As indicated by the discussion of user-provided inputs, the various percentage values may be variable. However, the percentage values may also be fixed by the account alert system 12.

Although the foregoing description of the method 50 has been described with respect to producing weather symbols, it should be noted that the present disclosure is not limited to providing forecast notifications using any particular type of symbol. For example, the storm icon may be replaced with a stop sign, the sun icon may be replaced with a green traffic light image, the rainy icon may be replaced with a yellow or red traffic light, and the like.

In some embodiments, the account alert system 12 may generate event alerts via visualizations or text depicted on the display 42. For example, a collection of the generated events may be presented in an alerts hub visualization that summarizes each of the event alerts that were generated since the user last accessed the account alert system 12. The text message or visualization may provide a brief description of a status of the account forecast (e.g., on target to achieve saving or spending goal). In addition, the text message or visualization may include recommendations to help the user achieve his savings goal. Additional details with regard to assisting the user to achieve his goals will be detailed below with reference to FIG. 8.

Referring back to FIG. 3, after associating the expected savings balance with a financial forecast category, at block 64, the account alert system 12 may send an account forecast category alert to the computing device 18 (e.g., smart phone 72). For instance, the account alert system 12 may send computer-executable instructions to the computing device 18 to open or execute an application that then displays an icon or image that represents the financial forecast category along with related data 102 (e.g., an explanation of the reason for the alert). In certain embodiments, in addition to the financial forecast category, the account alert system 12 may provide information (e.g., in the related data 102) regarding a budgeted amount available for the user to spend for a certain period of time (e.g., day). As such, the user may be aware of his budget and available funds to meet certain savings goals and expected liabilities at any given time.

In some embodiments, the account alert system 12 may send a notification to the computing device 18 providing a report that details a current expendable balance amount, one or more financial or accounting events (e.g. scheduled payments) scheduled for the day, and other relevant information. In addition, the account alert system 12 may provide information related to an expendable balance amount over a period of time. For instance, the account alert system 12 may indicate that the user has a certain amount of dollars left to spend over a certain amount of days. In this way, the account alert system 12 may better equip the user to spend his expendable balance while maintaining his savings goals.

After sending the account forecast category to the computing device 18, the account alert system 12 may return to block 56 and continue to receive credit and debit data. That is, the account alert system 12 may receive real-time or near real-time data regarding purchases or withdrawals made by the user. Using this updated information, the account alert system 12 may repeat blocks 60, 62, and 64 to provide real-time updated account alerts and account information to the user's computing device 18.

In some instances, if the user receives a notification indicating that he will exceed his allotted budget for a period of time, the user may wish to determine how to compensate for the excess spending while maintaining his budget goals. In one embodiment, the account alert system 12 may employ a method 80, as provided in FIG. 8, to determine target spending amounts to enable the user to still reach his budget goals.

Figure 8:
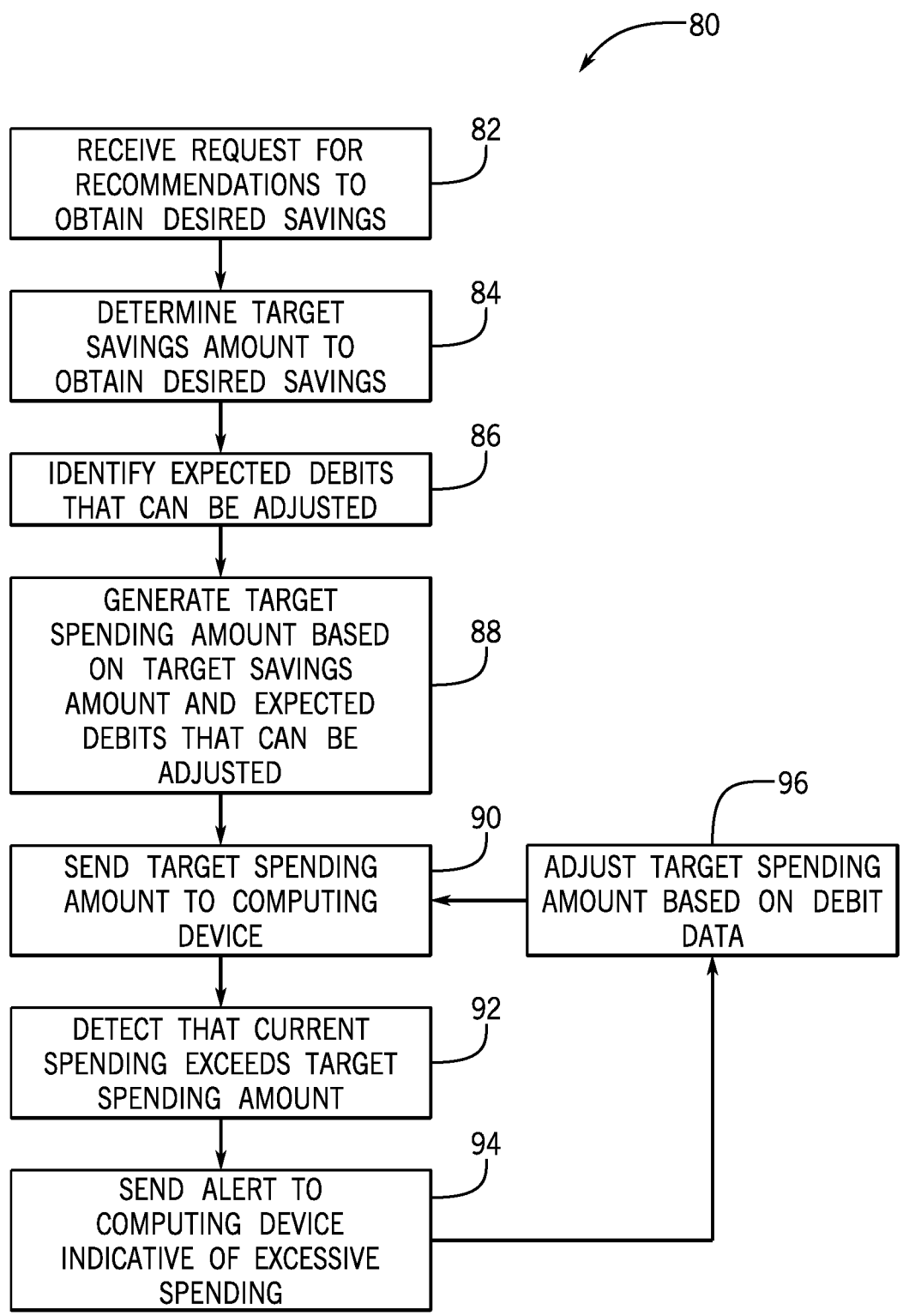
FIG. 8 illustrates a flow chart of a method for sending an alert indicative of an adjustment to spending via the account alert system of FIG. 2, in accordance with embodiments described herein.

Referring now to FIG. 8, the method 80 may be performed by the account alert system 12 or another suitable computing device. Moreover, although the method 80 is described in a particular order, it should be noted that the method 80 may be performed in any suitable order.

At block 82, the account alert system 12 may receive a request for recommendations to obtain a desired savings goal. The request may include a savings amount, a date in which the savings amount is desired to be achieved, account information, as described above, and the like. At block 84, the account alert system 12 may determine a target saving amount based on the information received at block 82 and account information described above with reference to block 52.

The account alert system 12 may then, at block 86, analyze the account information to identify expected debits that can be adjusted. For example, in one embodiment, the account alert system 12 may identify certain variable or irregular (e.g., non-uniform) expenditures present in the account information. The variable expenditures may be debits related to credit card bills, dining bills, and the like that are variable or not fixed. The account alert system 12 may distinguish between fixed expenditure and variable expenditures to determine an amount that the user may reduce in his regular spending habits.

In addition, the account alert system 12 may determine whether certain expenditures are related to a certain utility such as electricity, water, gas, and the like. These expenditures, although variable, may not be reduced without a change in behavior.

After identifying certain expenses that may be adjusted, at block 88, the account alert system 12 may generate a target spending amount for the user over a period of time based on the expected deposits for the user according to the account information and the identified adjustable expenses. In one embodiment, the account alert system 12 may determine the target spending amount based on the target savings amount determined at block 84 and the expected debits that can be adjusted at block 86. Using this information, the account alert system 12 may determine a target spending amount that the user may achieve to assist the user to achieve his desired savings goal.

In some cases, the account alert system 12 may not be able to identify expenditures that can be adjusted to meet the desired savings goal. In this case, the account alert system 12 may send a notification to the computing device 18 indicative of this finding or may send a notification suggesting a new date in which the desired savings amount may be achieved along with a target spending amount.

In certain embodiments, the account alert system 12 may perform one or more smoothing operations to adjust the target spending amount based on spending behavior over a period of time. By way of example, if, after two pay cycles, the user has underspent his target spending amount by a certain amount, and, after a third pay cycle, the user has overspent his target spending amount by another amount, the account alert system 12 may determine the target spending amount based on the underspending and overspending that occurred over the three pay cycles. That is, the account alert system 12 may determine an average amount of spending over the three pay cycles to determine the target spending amount.

In some embodiments, the account alert system 12 may determine the target spending amount based on funds available in one or more designated accounts. That is, if the target spending amount exceeds the account balance in one of a number of accounts held by the user, and if the user spends his target spending amount by withdrawing from one account, the user will overdraft the respective account. As such, the account alert system 12 may receive an indication as to a desired or default account to determine the target spending amount. The account alert system 12 may then use the funds available in the designated account in determining the target spending amount.

At block 90, the account alert system 12 may send the target spending amount to the computing device 18. As discussed above, the computing device 18 may receive the target spending amount and open an application to visually display the target spending amount. In some embodiments, the computing device 18 may provide an audible or physical (e.g., vibration) notification to the user to indicate that information has been received for the user to review. The target spending amount may be associated with a certain amount of time such as a day, week, month, or the like.

After sending the target spending amount to the computing device 18, the account alert system 12 may continue to receive credit and debit data as described above. At block 92, the account alert system 12 may detect that the current expenditures of the user exceed the target spending amount based on the credit and debit data. Upon detecting that the current expenditures exceed the target spending amount, at block 94, the account alert system 12 may send an alert to the computing device 18 indicative of the excessive spending. The alert may cause the computing device 18 to open an application, as discussed above, to notify the user of the alert.

Additionally, at block 96, the account alert system 12 may adjust the target spending amount based on the recent expenditures. For instance, the account alert system 12 may reduce the target spending amount to assist the user to meet his desired savings goal to compensate for the recent expenditures. Upon determining an adjusted target spending amount, the account alert system 12 may return to block 90 and send the adjusted target spending amount to the computing device 18. As such, the user may be updated with regard to a target spending amount to achieve his desired savings goal based on real-time spending data.

When analyzing the user's account information and credit or debit data, the account alert system 12 may distinguish between certain types of expenses that may not occur regularly. That is, when a non-recurring expense or withdrawal is detected, the account alert system 12 may provide an indication or message via the display 42 to notify the user the effects to the target spending or saving amount due to the detected expense. In some embodiments, the account alert system 12 may present the effects to the target spending in a daily alert that provides a daily spending goal. In one example, prior to the non-recurring expense taking place, the account alert system 12 may present a visualization that the user had a first amount of cash available to spend for each day of a week to reach his set goal. However, after the unexpected expense has occurred, the account alert system 12 may indicate that the user previously had a first amount of cash available to spend, but due to the unexpected expense, the user now has a second amount of cash available to spend each day of the week. The presentation of the effects of the unexpected expense may assist the user to change certain spending behavior to enable the user to be more likely to achieve his goals in the future.

With the foregoing in mind, in some embodiments, the account alert system 12 may track when the user spends less than his daily goal and update the amount available to spend for each day of the week accordingly. However, to encourage spending less to help the user reach his goals sooner, the account alert system 12 provides an indication of the amount that the user can potentially save because of his previous day's spending behavior. By maintaining the previously determined daily spending goal and simultaneously notifying the user the potential savings due to spending less than the spending goal, the account alert system 12 may encourage the user to have better saving habits.

Over time, as the user regularly receives notifications from the account alert system 12, the identified expected pay period, amount, and times described above with respect to block 54 may change. In the same fashion, the expected burn rate may also change based on changes to credit/debit data as described with respect to block 56. With this in mind, in some embodiments, the account alert system 12 may detect a new income source and generate a request for the user to indicate to the account alert system 12 as to whether the new income source will occur regularly. Based on the results of this inquiry, the account alert system 12 may adjust the expected savings and target spending operations described above.

In addition to new income sources, the account alert system 12 may also detect when a regularly occurring expense has increased in amount, frequency, or the like. Moreover, the account alert system 12 may detect whether a new regularly occurring expense is present based on the account information, the credit/debit data, and the like. After detecting the new regularly occurring expenses or changes, the account alert system 12 may request that the user indicate whether the user would like to account for these changes in the expected savings and target spending operations described above. If the user indicates to the account alert system 12 that the changes should be incorporated into its calculations, the account alert system 12 may adjust the expected savings and target spending operations based on the changes.

In certain embodiments, the account alert system 12 may provide virtual envelopes or earmark portions of funds for different designations. That is, instead of creating a separate account or holding for funds designated for different items (e.g., trips, purchases), the account alert system 12 may provide the user the ability to earmark or designate certain funds for different items that the user may be saving for. For instance, if the account alert system 12 determines that the user has spent less than his daily spending goal, the account alert system 12 may request that the user designate the saved funds for the day into a virtual envelope for savings. In some cases, the user may specify to the account alert system 12 that he wishes to save a certain amount of money to purchase some good. Instead of adjusting the spending target for the user, the account alert system 12 may generate a virtual envelope for the user to earmark for the purchase of the specified good. As funds are detected as additional savings aside from the specified savings goal, the account alert system 12 may indicate to the user that he may place the additional savings in the virtual envelope for the good. The account alert system 12 may thus provide the user the ability to monitor his account in a more granular format that is catered to the purchases that the user wishes to make. In addition, by providing virtual envelopes without adjusting the spending goals, the account alert system 12 may again assist the user in changing his spending habits to become a better saver.

In some cases, the account alert system 12 may provide the user the ability to automatically distribute additional funds to certain virtual envelopes according to user-defined percentages or the like. When presenting the virtual envelopes to the user, the account alert system 12 may generate visualizations that indicate an amount of funds that are available for each envelope. By separating the total funds of a user's account into virtual envelopes, the user may better gauge the amount of funds that he may have available to spend while maintaining his savings and attempting to achieve any purchase goals.

In addition to providing ways to encourage the user to save money, the account alert system 12 may also provide recommendations to enable the user to alter his spending habits. For example, the account alert system 12 may determine that the user makes a regular visit to a store (e.g., coffee shop) a number of times a week. If the account alert system 12 determines that the visit to the store is related to a recreational or non-essential purchase, the account alert system 12 may recommend that the user refrain from visiting the store a number of times a week to save a certain amount of money over a variable amount of time (e.g., week, month, year, years). With this in mind, the account alert system 12 may analyze the account information and/or the credit and debit data to identify spending behavior that is associated with a pattern behavior. The account alert system 12 may generate a notification for the user to recommend avoiding these pattern-related purchases to increase the user's savings potential.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a processor configured to:
receive account information comprising a plurality of transactions associated with a bank account corresponding to a first period of time;
identify one or more variable expenditures in the account information by comparing payment amounts to identical merchants over the first period of time, wherein the variable expenditures correspond to unequal payment amounts to the identical merchants;
determine an expected burn rate of funds for a second period of time based on the account information, the second period of time being after the first period of time and corresponding to an amount of time until a next deposit;
send the expected burn rate of funds to a computing device associated with a user, wherein the computing device comprises an electronic display configured to display the expected burn rate of funds corresponding to the second period of time;
determine an expected savings balance based on the account information and the expected burn rate of funds;
detect that a current spending amount associated with the second period of time exceeds the expected burn rate of funds corresponding to the second period of time based on credit data indicative of one or more purchases made during the second period of time, wherein the credit data is retrieved from one or more credit databases configured to update after the one or more purchases are completed;

generate an event in response to the expected savings balance being below a threshold and the current spending amount exceeding the expected burn rate of funds;

send an alert indicative of the event to the computing device, wherein the alert is configured to cause the computing device to activate and to automatically open an application that is configured to display a visualization representative of:
  a first indication of a status of the expected savings balance; and
  a second indication that the current spending amount exceeds the expected burn rate of funds;

detect an update to the account information, wherein the update is indicative of a new income source that corresponds to an additional transaction depositing funds into the bank account;

send a request for a confirmation input to the computing device, wherein the confirmation input is indicative of the new income source being a regularly occurring deposit;

update the expected savings balance based on the new income source in response to receiving the confirmation input;

generate an additional event in response to the updated expected savings balance being above the threshold; and send an additional alert indicative of the additional event to the computing device in response to updating the expected savings balance, wherein the additional alert is configured to cause the computing device to update the visualization to include a third indication that the updated expected savings balance is above the threshold.

2. The system of claim 1, wherein the processor is configured to associate one of a plurality of weather icons with the expected savings balance, wherein the one of the plurality of weather icons represents a current state of the expected savings balance.

3. The system of claim 1, wherein the account information comprises a list of debits and credits to one or more bank accounts over a period of time.

4. The system of claim 3, wherein the processor is configured to determine the expected burn rate of funds until the next deposit based on one or more expected deposits over an additional period of time after the period of time.

5. The system of claim 4, wherein the one or more expected deposits are determined based on a deposit history over the period of time.

6. The system of claim 3, wherein the processor is configured to determine the expected burn rate of funds until the next deposit based on one or more expected payments over an additional period of time after the period of time.

7. The system of claim 6, wherein the one or more expected payments are determined based on a payment history over the period of time.

8. A non-transitory computer-readable medium comprising computer-executable instructions, when executed, configured to cause a processor to:

receive a target saving amount via user input;

receive account information comprising a first plurality of transactions associated with a bank account over a first period of time;

identify one or more variable expenditures in the account information by comparing payment amounts to identical merchants over the first period of time, wherein the variable expenditures correspond to unequal payment amounts to the identical merchants;

determine a target spending amount corresponding to a second period of time based on the account information, the variable expenditures, and the target saving amount, the second period of time being after the first period of time;

send the target spending amount to a computing device comprising an electronic display configured to display the target spending amount corresponding to the second period of time;

receive updated account information comprising a second plurality of transactions associated with the bank account over the second period of time, the second period of time being after the first period of time;

detect that a current spending amount associated with the second period of time exceeds the target spending amount corresponding to the second period of time based on credit data indicative of one or more purchases made during the second period of time, wherein the credit data is retrieved from one or more credit databases configured to update after the one or more purchases are completed;

generate an event in response to the current spending amount exceeding the target spending amount;

send an alert indicative of the event to the computing device, wherein the alert is configured to cause the computing device to activate and to automatically open an application that is configured to display a visualization via the electronic display, the visualization comprising:
  a first indication that the current spending amount exceeds the target spending amount; and
  a first adjusted target spending amount for a third period of time, the first adjusted target spending amount different than the target spending amount;

detect an update to the account information, wherein the update is indicative of a new income source that corresponds to an additional transaction depositing funds into the bank account;

send a request for a confirmation input to the computing device, wherein the confirmation input is indicative of the new income source being a regularly occurring deposit;

update the target spending amount to a second adjusted target spending amount based on the new income source in response to receiving the confirmation input;

generate an additional event in response to the current spending amount being less than the second adjusted target spending amount; and send an additional alert indicative of the additional event to the computing device in response to updating the target spending amount to the second updated target spending amount, wherein the additional alert is configured to cause the computing device to update the visualization to include a second indication that the current spending amount is below the second updated target spending amount.

9. The non-transitory computer-readable medium of claim 8, wherein the processor is configured to adjust the target spending amount based on a plurality of deposits associated with a plurality of pay cycles over the first period of time and a difference between the target spending amount and the plurality of deposits.

10. The non-transitory computer-readable medium of claim 9, wherein the processor is configured to send an additional alert indicative of the second adjusted target spending amount to the computing device for display via the electronic display.

11. The non-transitory computer-readable medium of claim 8, wherein the processor is configured to determine the target spending amount based on a designation of a bank account selected via the user input.

12. The non-transitory computer-readable medium of claim 8, wherein the processor is configured to:
   identify a non-recurring expense in the account information during the second period of time;
   generate an additional visualization indicative of an effect to the target spending amount based on the non-recurring expense; and
   send the additional visualization to the computing device for display via the electronic display.

13. A method, comprising:
   receiving, via a processor, account information comprising a plurality of transactions associated with a bank account corresponding to a first period of time;
   identifying, via the processor, one or more variable expenditures in the account information by comparing payment amounts to identical merchants over the first period of time, wherein the variable expenditures correspond to unequal payment amounts to the identical merchants;
   determining, via the processor, an expected burn rate of funds for a second period of time based on the account information, the second period of time being after the first period time and corresponding to an amount of time until a next deposit;
   sending, via the processor, the expected burn rate of funds to a computing device associated with a user, the computing device comprising an electronic display configured to display the expected burn rate of funds corresponding to the second period of time;
   determining, via the processor, an expected savings balance based on the account information and the expected burn rate;
   detecting, via the processor, that a current spending amount associated with the second period of time exceeds the expected burn rate of funds corresponding to the second period of time based on credit data indicative of one or more purchases made during the second period of time, wherein the credit data is retrieved from one or more credit databases configured to update after the one or more purchases are completed;
   generating, via the processor, a first event in response to the expected savings balance being above a threshold, wherein the first event is configured to cause the computing device to open an application that is configured to display a first visualization indicative of the expected savings balance being above the threshold and a second visualization indicative of a virtual envelope to associate excess funds associated with the expected savings balance being above the threshold;
   displaying, via the processor, the virtual envelope via an electronic display;
   generating, via the processor, a second event in response to the expected savings balance being below the threshold and the current spending amount exceeding the expected burn rate of funds, wherein the second event is configured to cause the computing device to activate and to automatically open the application to cause the application to display a third visualization comprising:
      a first indication of a status of the expected savings balance; and
      a second indication that the current spending amount exceeds the expected burn rate of funds;
   detecting, via the processor, an update to the account information, wherein the update is indicative of a new income source that corresponds to an additional transaction depositing funds into the bank account;
   sending, via the processor, a request for a confirmation input to the computing device, wherein the confirmation input is indicative of the new income source being a regularly occurring deposit;
   updating, via the processor, the expected savings balance based on the new income source in response to receiving the confirmation input;
   generating, via the processor, a third event in response to the updated expected savings balance being above the threshold;
   sending, via the processor, an alert indicative of the third event to the computing device in response to updating the expected savings balance, wherein the alert is configured to cause the computing device to update the third visualization to include a third indication that the updated expected savings balance is above the threshold.

14. The method of claim 13, wherein the second visualization comprises an amount of funds associated with the virtual envelope.

15. The method of claim 13, wherein the third visualization comprises a savings potential amount associated with refraining from spending at the one of the identical merchants in the third period of time.

16. The method of claim 15, comprising associating one of a plurality of traffic icons with the expected savings balance, wherein the one of the plurality of traffic icons represents a current state of the expected savings balance.

17. The method of claim 16, comprising:
   generating an alert indicative of the one of the plurality of traffic icons; and
   displaying the alert via the electronic display.

18. The system of claim 2, wherein the visualization comprises the one of the plurality of weather icons representative of the current state of the expected savings balance upon receiving an indication of the one of the plurality of weather icons from the processor.

19. The method of claim 14, comprising distributing the excess funds to a plurality of virtual envelopes according to a plurality of user-defined percentages.

* * * * *